United States Patent [19]

Timmers

[11] Patent Number: 4,646,952

[45] Date of Patent: Mar. 3, 1987

[54] METHOD AND APPARATUS FOR CARRYING A LOAD WITH A MOTOR VEHICLE

[76] Inventor: Richard E. Timmers, 1210 E. County Rd. B, Maplewood, Minn. 55109

[21] Appl. No.: 755,693

[22] Filed: Jul. 16, 1985

Related U.S. Application Data

[63] Continuation-in-part of Ser. No. 611,494, May 17, 1984, abandoned.

[51] Int. Cl.⁴ ............................................. B60R 9/06
[52] U.S. Cl. ........................... 224/42.07; 224/42.03 R
[58] Field of Search ..................... 224/42.07, 42.03 R, 224/42.03 A, 42.03 B

[56] References Cited

U.S. PATENT DOCUMENTS

| | | | |
|---|---|---|---|
| 3,039,634 | 6/1962 | Hobson et al. | 224/42.03 R X |
| 3,176,903 | 4/1965 | Farley | 224/42.03 B |
| 3,251,520 | 5/1966 | Van Dyke et al. | 224/42.03 B |
| 3,650,443 | 3/1972 | Haskett et al. | 224/42.07 X |
| 3,724,694 | 4/1973 | Wilson | 224/42.07 X |
| 3,912,098 | 10/1975 | Nicotra | 224/42.03 B X |
| 4,072,257 | 2/1978 | Hall | 224/42.03 B X |
| 4,189,274 | 2/1980 | Shaffer | 224/42.03 B X |
| 4,234,284 | 11/1980 | Hauff | 224/42.03 R X |
| 4,381,069 | 4/1983 | Kreck | 224/42.03 R X |

*Primary Examiner*—Stephen Marcus
*Assistant Examiner*—Robert M. Petrik

*Attorney, Agent, or Firm*—Merchant, Gould, Smith, Edell, Welter & Schmidt

[57] ABSTRACT

Method and apparatus for carrying a load with a motor vehicle (90). One embodiment of the apparatus, a rack (10), includes a fixable portion (12) which is preferably welded to the frame (100) of the vehicle (90) near the rear bumper (97) or end surface of the vehicle. A movable portion (14) is configured to slidably engage the fixable portion (12) and, once the portions (12) and (14) are engaged, they are locked together using, preferably, bolts (84) and (86) which engage holes in connecting struts (16) and (18) of the fixed portion (12) and engage holes in the movable portion (14). In one embodiment of the present invention, a motorcycle carrier (40) is attached to movable slides (32) and in another embodiment a substantially planar platform (100) makes up a movable portion (14') of a rack (10'). The platform (100) can be used for carrying various bulky and unwieldy items. The invention also includes a method for carrying a load with a motor vehicle (90). The method includes attaching a fixable slide to a motor vehicle and slidably engaging a movable portion therewith, the movable portion including, in one embodiment, a motorcycle carrier and in another embodiment, a substantially planar utility platform. Other embodiments include alternative methods for connecting the fixable portion of the rack to the motor vehicle, and include an adjustable clamping apparatus (152) for accommodating a wide variety of motorcycles.

1 Claim, 8 Drawing Figures

METHOD AND APPARATUS FOR CARRYING A LOAD WITH A MOTOR VEHICLE

FIELD OF THE INVENTION

This application is a continuation-in-part of application Ser. No. 611,494, filed on May 17, 1984, now abandoned.

The present invention relates generally to methods and apparatus for carrying loads with motor vehicles. More particularly, the present invention relates to methods and apparatus for carrying loads with motor vehicles using a rack which mounts near the rear end of the motor vehicle.

BACKGROUND OF THE INVENTION

The present invention relates to apparatus and related methods for carrying loads with a motor vehicle. It is primarily directed to means and methods for carrying loads with a motor vehicle other than through the use of traditional integral components of the motor vehicle itself, namely the trunk or other storage region of the vehicle that was included with the vehicle as manufactured.

Several devices and techniques have been used in the past for carrying loads with motor vehicles. One technique for carrying loads with a vehicle involves the use of a trailer hitch attached to the rear end of the vehicle, the trailer hitch typically including a spherical member, a "ball," which engages a socket of a trailer. Trailers have been used for hauling boats, snowmobiles, campers and miscellaneous items.

Trailer systems, as a class, possess several shortcomings. For one, it is often difficult to maneuver the motor vehicle with the trailer attached. This is particularly true when the motor vehicle and trailer are being operated in reverse. Also, trailers include their own set of wheels and a suspension system and these components are expensive and subject to failure and maintenance problems in many cases.

Additionally, many trailers are specifically designed for a particular purpose and this can be quite inconvenient. For example, if the owner of a motor vehicle wishes to carry both a motorcycle and a boat and his trailer is only capable of carrying the boat, he will not be able to transport the motorcycle in most cases.

Another type of load-carrying system that has been used with motor vehicles is the top carrier system. Here, racks or brackets are attached to the top of the vehicle, either on the trunk lid or the topmost portion of the vehicle, and the items which are to be carried are strapped to the brackets or racks. Clearly, this system is limited to relatively light loads which are not terribly bulky or unwieldy.

Still another system which has been utilized is the bicycle rack which attaches to the front or back of the vehicle. The bicycles are typically positioned so that they are carried in a rack above the ground and the bikes are substantially perpendicular to the direction of travel of the vehicle. If the rack is mounted on the front of the motor vehicle and the bicycles are connected thereto, the forward visability of the driver is at least partially blocked. Furthermore, if the bicycle rack and bicycles are mounted to the rear of the vehicle, this very often interferes with trailer towing. Also, such bicycle racks are designed only for very light loads and are typically limited to carrying bicycles or similar loads.

The prior art also includes a motorcycle rack which is suitable for attaching to the front of a vehicle. Clearly, such a rack presents the potential of blocking the vision of the driver as did the front-mounted bicycle rack. This type of rack includes a fixable portion which attaches to an undersurface of the vehicle, i.e., the frame of the vehicle, and a movable portion which engages with the fixable portion during use and is removed when the motorcycle is not being transported. In order to engage the movable portion of the rack with the fixable portion of the rack, the movable portion is positioned beneath the front end of the motor vehicle and raised so that it aligns with the fixable portion of the rack. Locking means are then used to lock the individual portions of the rack together. The engaging process is quite inconvenient since the owner of the vehicle has to raise the movable portion of the rack into alignment with the portion attached to the frame prior to locking the portions together. Additionally, this type of motorcycle rack is only useful for motorcycles or loads having similar physical characteristics. That is, it is not generally applicable to other types of loads that are bulky or unwieldy.

The present invention is directed to the shortcomings of the load-carrying devices discussed above. Specifically, the present invention includes a method and an apparatus for carrying a load with a motor vehicle wherein the load is carried near the rear end of the vehicle so as not to block the vision of the driver. Also, although the rack includes a movable portion and a fixed or fixable portion suitable for connecting to an undersurface of a vehicle as did the prior art motorcycle rack discussed above, the fixable and movable portions are readily slid into engagement so that the movable portion does not have to be raised vertically into position prior to interlocking the movable and fixable portions of the rack. Additionally, the present invention includes a motorcycle rack but also includes a utility platform which can be used to carry loads having a variety of shapes and masses. That is, the movable portion of the rack can be suitable for carrying a motorcycle or suitable for carrying other types of loads.

Therefore, when the present invention is employed the driver's forward vision is not blocked, the vehicle's maneuverability is not hindered by a trailer and massive and unwieldy loads can be transported with the rack. Also, in one embodiment of the present invention, a motorcycle or the like can be carried while a trailer is simultaneously pulled.

SUMMARY OF THE INVENTION

The present invention includes a method and apparatus for carrying a load with a motor vehicle. More particularly, the present invention includes a motor vehicle rack for carrying a load above a ground plane proximate to an end surface of a motor vehicle. The rack is suitable for operatively connecting to an undersurface of the motor vehicle, the undersurface having a rearward end and a forward end. Two embodiments of the rack include an elongate fixable slide having a first end and a second end; means for securely connecting the fixable slide to the undersurface of the motor vehicle wherein the fixable slide second end is proximate to the rearward end of the undersurface and the fixable slide first end is proximate to the forward end of the undersurface; an elongate movable slide configured for slidable engagement with the fixable slide having a first end and a second end, wherein the slides are slidably changeable from a disengaged configuration wherein the movable slide first end is adjacent to the fixable slide second end to an engaged configuration wherein the first ends are adjacent and the second ends are adjacent; means operatively connected to the movable slide and proximate to the movable slide second end for engaging the load; and means for locking the slides in said engaged configuration.

In two embodiments of the apparatus of the present invention, the fixable slide of the rack includes first and second substantially parallel elongate metal members. In these embodiments, the connecting means is suitable for securely holding the fixable members substantially parallel to the ground plane. Also, in one embodiement the movable slide includes first and second substantially parallel elongate metal members, wherein the fixable members of the fixable slide are suitable for slidably supporting the elongate members of the movable slide, the first members being slidably engageble and the second members being slidably engageable. For example, the fixable members of the rack are fabricated from steel angle iron and the movable members are fabricated from rectangualr steel tubing which are supported by the angle irons.

In another embodiment, the fixable members slidably receive the movable members. For example, the fixable members are rectangular tubing of a first size and the movable members are rectangular tubing of a smaller second size.

In still another preferred embodiment, the locking means of the rack includes bolts and nuts which lock the fixable and movable portions of the rack in their engaged configuration.

Another preferred embodiment includes a motorcycle carrier as the load engaging means wherein the carrier is suitable for carrying a motorcycle.

In another embodiment, the motorcycle carrier includes an elongate main channel connected and substantially perpendicular to the first and second movable members. The main channel is suitable for receiving the wheels of a motorcycle. This embodiment also includes an elongate detachable ramp suitable for collinear alignment with the main channel so that the motorcycle can be rolled from the ground plane to the main channel. This embodiment further includes means for retaining the motorcycle in the main channel.

The retaining means preferably includes a clamp which attaches to the body of the motorcycle, and in one embodiment the clamp is vertically and horizontally adjustable.

The retaining means mentioned above, in preferred embodiments, includes a retaining channel which has a width suitable for receiving one of the wheels of the motorcycle. The retaining channel is preferably welded to and angularly disposed from one end of the main channel and the ramp detachably connects to the other end of the main channel.

An additional feature of one embodiment of the present invention is a trailer hitch attached to the fixable slide. Still another embodiment includes a trailer hitch attached to the movable slide.

In one rack of the present invention, the loadengaging means is a substantially planar platform. The platform is suitable for being supported substantially parallel to the ground plane with the platform extending substantially perpendicular to and rearwardly from the end surface of the motor vehicle. The platform, as was the motorcycle carrier, is attached to one end of the movable slide.

Another embodiment of the platform rack includes a trailer hitch on the fixable side, the hitch being accessible when the movable slide is disengaged.

Still another motor vehicle rack of the present invention includes a fixable receiving channel fabricated from rectangular tubing having a first length; means for securely connecting the fixable receiving channel to the undersurface of the motor vehicle proximate to the end surface of the motor vehicle; an elongate movable slide fabricated from rectangular tubing configured for slidable engagement with the fixable receiving channel having a second length substantially longer than the first length and having a first end and a second end, wherein the first end is suitable for slidably engaging the fixable receiving channel; means operatively connected to the movable slide and proximate to the movable slide second end for engaging the load; flexible lineal means for hanging the movable slide from the end surface of the motor vehicle; and means for locking the slide and the channel together once they have been slidably engaged.

The present invention also includes a method for carrying a load with a motor vehicle. The method includes a method for carrying a load with a motor vehicle above a ground plane proximate to an end surface of the motor vehicle, the method including:

(a) selecting an elongate fixable slide having a first end and a second end;

(b) securely connecting the fixable slide to an undersurface of the motor vehicle, the undersurface having a rearward end and a forward end, wherein the fixable slide second end is proximate to the rearward end of the undersurface and the fixable slide first end is proximate to the forward end of the under surface;

(c) selecting an elongate movable slide having a first end, and a second end and including load engaging means proximate to the movable slide second end;

(e) sliding the movable slide from a disengaged configuration wherein the movable slide first end is adjacent to the fixable slide second end to an engaged configuration wherein the first ends are adjacent and the second ends are adjacent;

(f) locking the movable slide to the fixable slide; and (g) engaging the load with load engaging means.

A method of the present invention is further characterized in that selecting the elongate fixable slide includes selecting first and second elongate metal fixable members. Further with regard to this method, connecting of the fixable slide includes securely positioning the fixable members so that they are substantially parallel to one another and to the ground plane. This method is also characterized in that selecting the elongate movable slide includes selecting first and second elongate metal movable members and the sliding step mentioned above includes slidably engaging the first members and slidably engaging the second members.

The method of the present invention is further defined in that the load may be a motorcycle with the load engaging means being a motorcycle carrier. Alternatively, the load engaging means could include a substantially planar utility platform suitable for being supported substantially parallel to the ground plane.

DETAILED DESCRIPTION OF THE INVENTION

The following is a detailed description of preferred embodiments of the invention, and like reference numerals represent like components throughout the several views.

Figure 1:
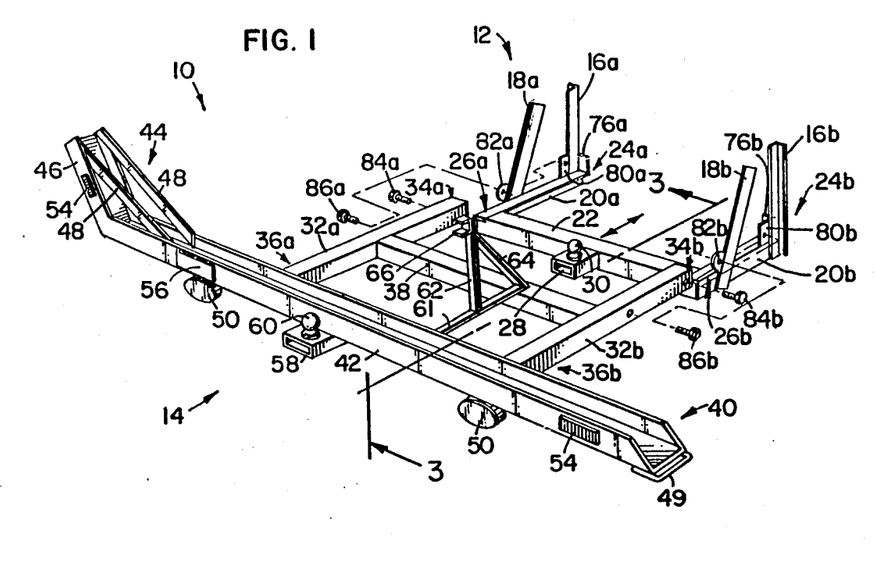
FIG. 1 shows a perspective view of one embodiment of the rack of the present invention, the fixable and movable portions being disengaged.
Figure 3:
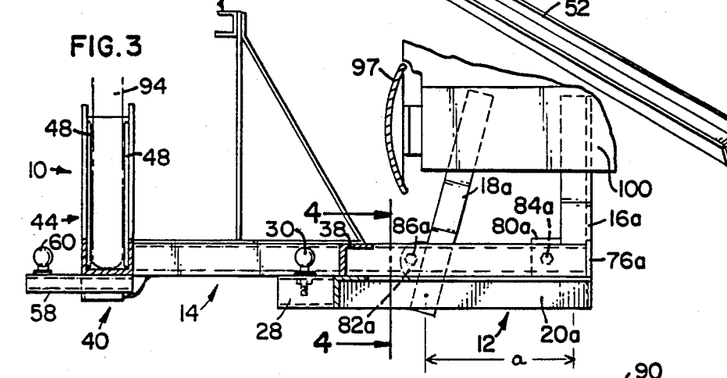
FIG. 3 shows a cross-sectional elevational view of the rack of FIG. 1 taken generally along line 3—3 of FIG. 1 but with the rack in its assembled or engaged configuration and with the motorcycle in position.
Figure 4:
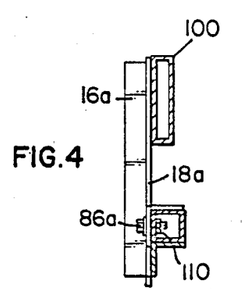
FIG. 4 shows a front cross-sectional view of various components of the rack shown in FIG. 1, including the means for connecting to the frame of the motor vehicle, FIG. 4 being a view taken generally along line 4—4 of FIG. 3.

FIG. 1 shows a preferred embodiment of a rack 10 constructed according to the principles of the present invention. The rack 10 includes a fixable portion 12 which is suitable for mounting to an undersurface of a motor vehicle as shown in FIGS. 3 and 4, discussed below. Typically, the fixable portion 12 is mounted to the frame of the vehicle, through the invention contemplates other connection placements and techniques. The rack 10 also includes a movable portion 14 which is configured to slidably engage the fixable portion 12 as further discussed below.

The fixable portion 12 of the rack 10, in its preferred embodiment, includes front connecting struts 16a and 16b and rear connecting struts 18a and 18b. The struts 16 and 18 are securely fastened to an undersurface of a motor vehicle using standard welding techniques or other fastening techniques as well known to those skilled in the art. It will be recognized that the struts 16 and 18 could be replaced by stamped and formed parts and need not be constructed of steel angle iron and steel bar as shown in FIG. 1.

As shown in FIG. 1, the front struts 16 are preferably made of steel angle iron and rear struts are preferably made of steel plate or bar and both are of sufficient gauge to accommodate the loads suffered by the rack 10.

The struts 16 and 18 are preferably welded to and support fixable slides 20a and 20b. That is, for example, fixable slide 20a is supported by front connecting strut 16a and rear connecting strut 18a. The struts 16 and 18 are preferably welded to the corresponding fixable slides 20 but those skilled in the art will recognize that any conventional fastening technique could be used.

The distance between each front strut 16a, 16b and the associated rear strut 18a, 18b is preferably at least 8 inches measured at their points of connection with the associated fixable slide 20a, 20b. This distance is labeled in FIG. 3 with a lower case "a". This distance "a" determines the amount of mechanical leverage that the struts 16 and 18 exert on the fixable slides 20 and ultimately the load-carring capability of the rack 10. Preferably, the fixable slides 20 are rigidly held in position by the struts 16 and 18 so that the fixable elongate slides 20 are parallel to one another and substantially parallel to the ground when the fixable portion 12 of the rack 10 is secured to the undersurface of the motor vehicle. The fixable slides 20 are preferably fabricated using steel angle iron as shown in FIG. 1, the gauge and sectional width of the angle iron being similar to those of the front struts 16.

To complete the main superstructure of the fixable portion 12, a fixable cross member 22 interconnects rearward ends 26 of the fixable slides 20. That is, the fixable slides 20 have forward ends 24a and 24b and rearward ends 26a and 26b. The fixable cross member 22 preferably interconnects the fixable slides 20 at their rearward ends 26. Those skilled in the art will recognize that it may not be necessary in some embodiments to interconnect the fixable slides 20 and, even if the fixable slides 20 are interconnected, they need not be connected at their rearward ends 26 in all cases.

Substantially centered on the fixable cross member 22 is a fixable trailer hitch extension 28. The extension 28 is preferably made of rectangular steel tubing which is welded to the cross member 22. The extension 28 extends rearwardly from the member 22 and acts as a base for a fixable ball 30 which is configured to engage a socket of a trailer as well known to those skilled in the art.

The movable portion 14 of the rack 10 preferably includes a pair of substantially parallel movable slides 32a and 32b. The movable slides 32 are preferably made of rectangular steel tubing having strength sufficient to withstand the loads which are imparted to the rack 10 when it is being used.

The movable slides 32 have forward ends 34 and rearward ends 36. Furthermore, in the embodiment shown in FIG. 1 the movable slides 32 are preferably elongated as are the fixed slides 20. The movable slides 32a and 32b are spaced apart by a movable cross member 38 which is preferably rectangular steel tubing which is welded to the movable slides 32 to interconnect the slides 32. Preferably, the movable cross member 38 is substantially perpendicular to the movable slides 32a and 32b and is substantially centered between the forward ends 34 and rearward ends 36 of the slides 32. It should be noted that the "movable" cross member 38 is termed as such only to distinguish it from the "fixed" cross member 22, and it will be recognized that the movable member 38 is preferably immobile in relation to the "movable" slides 32.

The movable slides 32 are preferably made of rectangular steel tubing having gauge and dimensions substantially similar to the cross member 38. Preferably, the movable slides 32 and the movable cross member 38 are made of 2¼ inch square tubing.

The movable portion 14 also includes a load engaging means which, in this embodiment, is a motorcycle carrier 40. The carrier 40 preferably includes a main channel 42 which is located toward and preferably welded to the rearward ends 36 of the slides 32. The main channel 42 of the motorcycle carrier 40 is also preferably substantially perpendicular to the movable slides 32. The main channel 42 is preferably steel channel having an approximately 5 inch lower base.

The motorcycle carrier 40 also includes a retaining apparatus 44 at one end of the main channel 42. The retaining apparatus 44 includes, in this embodiment, a retaining channel 46 which is angularly disposed with respect to the main channel 42 and extends upwardly therefrom. The retaining channel 46 is preferably a steel channel also having a 5 inch base and is preferably welded to the main channel 42. The retaining channel 46 is more securely held in place by a pair of retaining struts 48. The retaining struts 48 are also preferably welded in place. The struts 48 angle downwards from the upper end of the retaining channel 46 to the main channel 42 and serve to further retain the motorcycle as discussed below.

The main channel 42 also preferably supports a pair of tail lights 50 which are connected to the electrical system of the motor vehicle so that they will work in concert with the tail lights of the motor vehicle.

The main channel 42 also supports a ramp hook 49 at the opposite end of the main channel 42 with respect to the retaining apparatus 44. The ramp hook 49 is preferably a piece of steel rod which has been bent in a substantially hook-like shape and welded to the underside of the main channel 42. An aperture is created between the ramp hook 49 and the main channel 42 and this aperture is sized to admit a tab (not shown) of a ramp 52, the ramp 52 being shown in FIG. 2.

The motorcycle carrier 40 also preferably carries a pair of reflectors 54 as shown in FIG. 1. Also, a license plate holder 56 is attached to the main channel 42 above one of the tail lights 50.

Substantially centered between the movable slides 32 on the main channel 42 is preferably connected a movable trailer hitch extension 58. The extension 58 is substantially similar to the fixed extension 28 discussed above with reference to the fixed portion 12 of the rack 10. Furthermore, the movable extension 58 supports a movable ball 60 in like manner to the fixed ball 30 being supported by the fixed extension 28. As discussed below, even when the movable portion 14 is fully engaged with the fixed portion 12 the movable ball 60 accommodates the socket of a trailer so that a trailer can be pulled when the rack 10 is in use.

Figure 2:
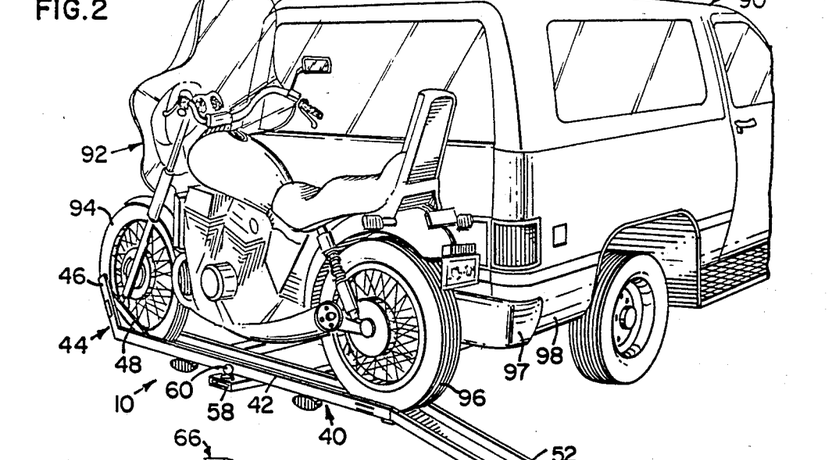
FIG. 2 shows the rack shown in FIG. 1 with the fixable and movable portions engaged and mounted on a motor vehicle and being used to carry a motorcycle.

Spanning between the main channel 42 and the movable cross member 38 is a clamp spanning member 61. The spanning member 61 is preferably made of steel strap which is welded to the cross member 38 and the main channel 42 such that the spanning member 61 is parallel to the movable slides 32. Extending upwards from and substantially centered on the member 61 is a clamp upright 62 which is made of a similar material. To complete a strong structural member, a clamp diagonal member 64 extends diagonally downward from the topmost portion of the clamp upright 62 to the movable cross member 38. Atop the apex of the triangle created by the members 61, 62 and 64 is a clamp 66. The clamp 66 is designed to operatively engage the body of a particular motorcycle which is carried by the morotcycle carrier 40 and the design of the clamp will vary depending on the motorcycle and the placements of the components on a given motorcycle. For example, the clamp, 66 might be configured to engage the kickstand of a motorcycle to better secure the motorcycle in the carrier 40. Generally, the clamp 66 and the retaining apparatus 44 make up a means for retaining and stabilizing the motorcycle 92 (FIG. 2).

The rack 10 also include means for locking the movable portion 14 to the fixed portion 12 when the portions are fully engaged so that the forward ends 34 of the movable slides 32 are substantially adjacent to the forward ends 24 of the fixed slides 20. It should be noted that a pair of stops 76 are welded atop the fixed slides 20 at the forward ends 24 of the slides 20. The stops 76a and 76b act to stop the movable slides 32 as they are slid into engagement in the fixed slides 20. The stops 76 are preferably simply rectangular pieces of steel plate which are welded to the front connector struts 16 and the fixed slides 20.

The rack 10 preferably includes means for locking the movable portion 14 to the fixed portion 12 when the portions are fully engaged, i.e., when the movable slides 32 strike the stops 76. The locking system preferably includes a pair of forward locking plates 80 which are welded to the top surface of the slides 20 and are also welded to the front connector struts 16. Similarly, welded to the rear connecting struts 18 are rear locking plates 82. The forward plates 80 and rear plates 82 form apertures suitable for receiving locking bolts as described below.

The movable slides 32 also form apertures suitable for receiving locking bolts 82 and 86 and the distances between the apertures formed by movable slides 32 are equal to the spacings between the corresponding apertures formed by the plates 80 and 82. Thus, when the movable portion 14 is fully engaged with the fixed portion 12 the holes in the plates 80 and 82 align with the holes in the movable slides 32. Forward bolts 84 and rear bolts 86 complete the locking system by engaging the holes in the plates 80 and 82, respectively. The bolts 84 and 86 also engage the apertures formed by the movable slides 32 and threaded nuts 110 (see FIG. 4) which are welded within the tubing which comprises the movable slides 32. The nuts 110 act to threadedly receive the bolts 84 and 86 so as to securely lock the movable portion 14 to the fixed portion 12. The bolts 84 and 86 are simply removed when it is desired to disengage the movable portion 14 from the fixed portion 12.

FIG. 2 shows a perspective view of the rack 10 operatively connected to a motor vehicle 90. The rack 10 includes the motorcycle carrier 40 which is shown supporting a motorcycle 92. The motorcycle 92 has been rolled up the inclined ramp 52 from the ground plane to the main channel 42. The front wheel 94 and the rear wheel 96 of the motorcycle 92 ride in the main channel 42 of the carrier 40. Furthermore, the front wheel 94 engages the retaining apparatus 44 so as to stabilize the motorcycle 92 in the carrier. That is, the front wheel 94 is substantially braced by the retaining channel 46 and the retaining struts 48 so that the front wheel 94 cannot turn of tilt from a vertical orientation. Once the motorcycle 92 is so positioned, the ramp 52 can be removed. The ramp 52 can be strapped to the movable slides 32 using a flexible cord or the like so that it can be carried along for subsequent use. The clamp 66 and attendant supporting parts 61, 62 and 64 are used to further brace the motorcycle to maintain it in a vertical orientation and to prevent it from rolling off of the motorcycle carrier 40.

It should be noted that the invention is not limited to the motor vehicle 90 and can be used with virtually any type of motor vehicle. For the sake of illustration, however, as shown in FIG. 2, the motor vehicle 90 includes a rear bumper 97 and a rear quarter panel 98. In all embodiments, however, the load carried by the rack is supported so that it is near the tailgate or end surface of the vehicle. That is, the load, the motorcycle as shown in FIG. 3, is supported above the ground plane and near the rear end of the motor vehicle.

FIG. 3 shows a cross sectional view of a portion of the rack 10, the cross section taken generally along line 3—3 of FIG. 1. FIG. 3 shows quite clearly the engaged configuration of the movable portion 14 and fixed portion 12 of the rack 10. The movable portion 14 is slid into engagement with the fixed portion 12 until the stops 76 prevent any further sliding. Thereafter, the bolts 84 and 86 are inserted through the plates 80 and 82, respectively, thereby locking the movable portion 14 to the fixed portion 12.

FIG. 3 also shows the manner in which the fixed slides 20 are suspended below the undersurface of the motor vehicle 90. The fixed slides 20 are preferably supported so that they are substantially parallel to the ground plane which supports the motor vehicle 90. Also, the motorcycle carrier 40 is configured so that it is generally proximate to the bumper 97 of the motor vehicle 90.

FIG. 3 additionally shows that the movable cross member 38 lies forward of the fixed ball 30 when the movable portion 14 is fully engaged with the fixed portion 12. Therefore, when the movable portion 14 is being slid into the engaged configuration, the portion 14 must be tilted slightly forward and upward so that the movable cross member 38 can clear the fixed ball 30. Of course, it is recognized that the invention includes motor vehicle racks which do not include a fixed trailer hitch ball 30 as shown in FIG. 3.

As also shown in FIG. 3, the motorcycle 92 is held so that it is substantially parallel to the bumper 97 of the motor vehicle 90. The front wheel 94 of the motorcycle 92 is shown as it is restrained by the restraining apparatus 44.

FIG. 4 shows a cross-sectional elevational view of a portion of the rack 10, as taken along line 4—4 of FIG. 3. FIG. 4 illustrates rear bolt 86a as engaged with nut 110 welded to the interior surface of the movable slide 32a. FIG. 4 shows the rear connecting strut 18a and the front connecting strut 16a and illustrates that they are preferably welded to frame 100 of the motor vehicle 90. Generally, the struts 16 and 18 are connected to an undersurface of the motor vehicle 90 and the present invention is not limited to a particular fastening technique. That is, the fixed slides 20 can be held in position by any mechanical means including bolted parts or weldments or parts that are stamped and formed. The precise technique for connecting to the frame of the motor vehicle 90 is dependent on the type of vehicle and the arrangement of components on the vehicle's underside. In some motor vehicles, it may be desirable to have additional supporting struts to increase the rigidity of the fixed portion 12 of the rack 10.

Figure 5:
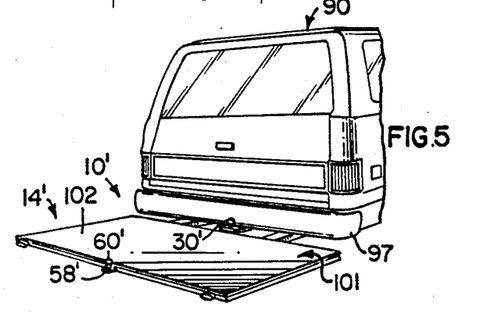
FIG. 5 shows a perspective view of another embodiment of the rack, a utility platform, operatively engaged with a motor vehicle.

FIG. 5 shows the motor vehicle 90 with the movable portion 14 shown in FIG. 1 removed and, in its place, a movable portion 14'. The movable portion 14' is substantially identical to the movable portion 14 with the exception that the motorcycle carrier 40 is removed and replaced by a utility platform 101. The large planar surface 102 of the platform 101 is preferably constructed of a steel frame made up of welded square tubing and the frame is encased using plywood or sheet metal. Of course, the movable portion 14' does not include a motorcycle clamp 66 or attendant parts. Also, the platform 101 preferably includes a movable trailer hitch extension 58' and ball 60'.

In use, referring to FIG. 1, the movable portion 14 of the rack 10 is slid into engagement with the fixed portion 12 until the stops 76 prevent further sliding of the movable portion 14. Once the portions 14 and 12 are fully engaged, the bolts 84 and 86 are inserted through plates 80 and 82, respectively, into apertures in the movable slides 32. Nuts 110, welded to inside surfaces of the movable slides 32, threadedly receive bolts 84 and 86 so that the movable portion 14 is locked in position.

Once the movable portion 14 is locked, the ramp 52 can be attached to the main channel 42 of the motorcycle carrier 40 as shown in FIG. 2. The ramp 52 includes a tab (not shown) which engages the hook 48 so that the ramp 52 is "collinear" with the main channel 42. By collinear, it is meant that the channel 42 and inclined ramp 52 are aligned so that the motorcycle 92 can roll up the ramp 52 onto the channel 42. The motorcycle 92 can then be rolled up the ramp 52 onto the main channel 40 with the front wheel 94 being retained by the retaining apparatus 44 of the carrier 40. The clamp 66 is used to hold the motorcycle 92 in a substantially vertical and stable orientation. Once the motorcycle 92 is stable and clamped, the ramp 52 can be removed and laid aside or, alternatively, strapped to the rack 10 for future use.

If it is desirable to use the movable portion 14' in lieu of the movable portion 14, the procedure is as follows: the bolts 84 and 86 are removed and the portion 14 is slid out of engagement with the fixed portion 12. As noted above, the movable portion 14 must be tipped slightly so that the cross member 38 clears the fixed ball 30. Once the movable portion 14 has been removed, the movable portion 14', including the platform 101, can be slid into position and locked using the bolts 84 and 86 as described above with reference to the movable portion 14. The platform 101 can then be used to carry large and unwieldy loads.

It should be noted that the present invention is not limited to sliding contact per se between the fixable portion 12 and the movable portion 14 or 14'. That is, any relatively low friction technique, including rolling contact through the use of bearings or the like, could be utlized.

Figure 6:
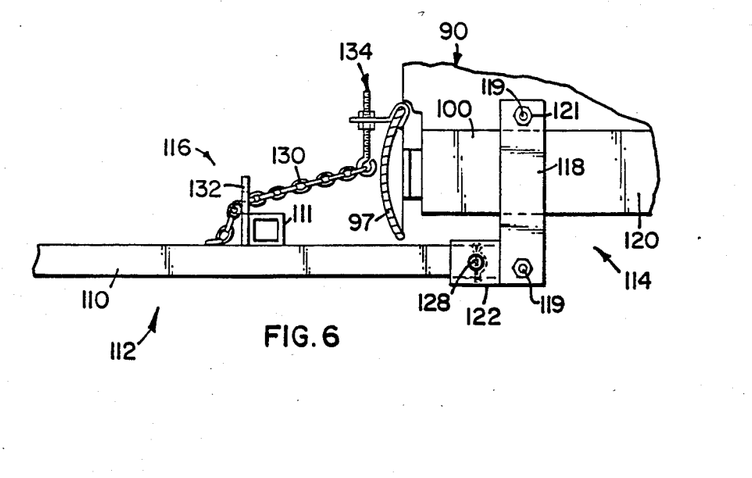
FIG. 6 shows a cross-sectional elevational view of a second embodiment of the present invention, the means for connecting to the motor vehicle being illustrated.
Figure 7:
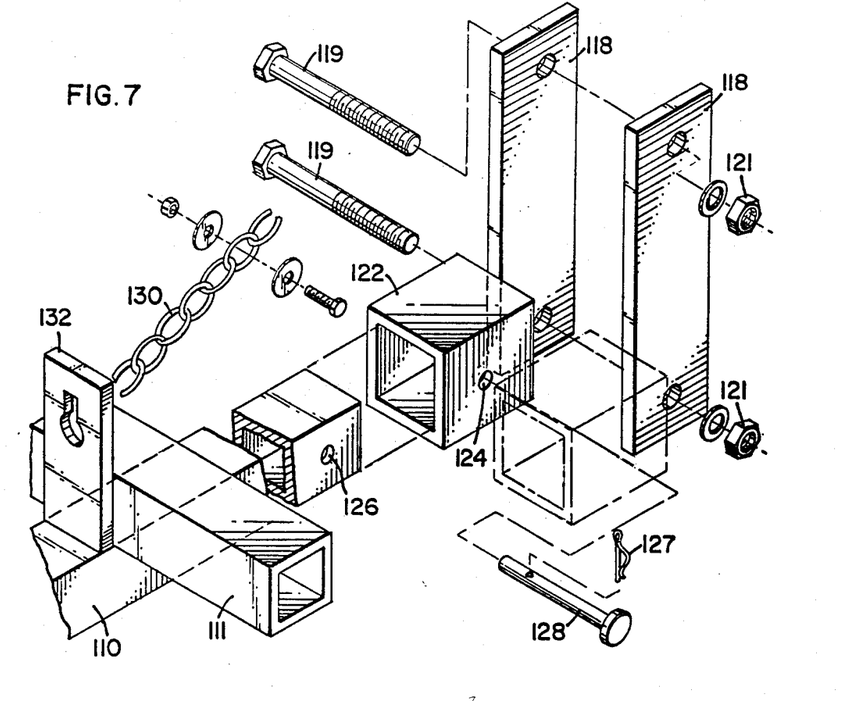
FIG. 7 shows an exploded perspective view of the embodiment shown in FIG. 6, the connecting means being shown.

FIGS. 6 and 7 show partial views of another embodiment of the present invention. FIG. 6, in particular, shows a side elevational view of an alternative way of connecting the movable portion of the rack to the fixable portion of the rack.

The rack 116 shown in FIG. 6 includes a movable portion 112 which includes elongate movable members 110. The members 110 are configured to slidably engage a fixable portion 114 of the rack 116. The members 110 are structurally and functionally similar to the members 32 of the embodiments shown in FIGS. 1 through 5. Also, although only one member 110 is illustrated in FIGS. 6 and 7, it is understood that preferably there are two members 110 just as there were two members 32 in FIG. 1.

The fixable portion 114 preferably includes vertical struts 118 which act to frictionally straddle a frame portion 120 of the motor vehicle 90. Securely attached, preferably welded, to one of the vertical struts 118 is a receiving channel 122. As shown in FIG. 7, the receiving channel 122 can be welded to either of the vertical struts 118, but as well known to those skilled in the art, the receiving channel 122 can be attached to the struts 118 using fastening techniques other than welding. The receiving channel 122 is preferably square steel tubing which is sized to slidably admit or receive one of the elongate movable members 110. Of course, there is a second channel 122 and corresponding struts 118 which are not illustrated but which make up the other side of the fixable portion 114 of rack 116.

Also, the receiving channel 122 forms an aperture 124 which aligns with an aperture 126 formed by the movable member 110. When the movable member 110 and corresponding receiving channel 122 are engaged, a stud 128 can be inserted through the apertures 124 and 126 to lock the portions of the rack 116 together. Cotter pin 127 locks the stud 128 in place.

This locking function is assisted by a chain 130 which runs from an apertured receiving plate 132 welded to the movable member 110 to a bumper bracket 134 which hooks onto the upper edge of the bumper 97 of the motor vehicle 90.

It should be noted that FIGS. 6 and 7 illustrate an alternative means of connecting the movable portion of a rack to the fixable portion of the rack and also illustrates an alternative means of connecting the fixable portion of a rack to the motor vehicle. The movable member 110 illustrated in FIGS. 6 and 7 corresponds to one of the movable members 32 shown in FIGS. 1 and 3. Also, the remaining components of the movable portion 112 of the rack 116 are preferably substantially identical to the components of the movable portions 14 or 14' discussed above.

Figure 8:
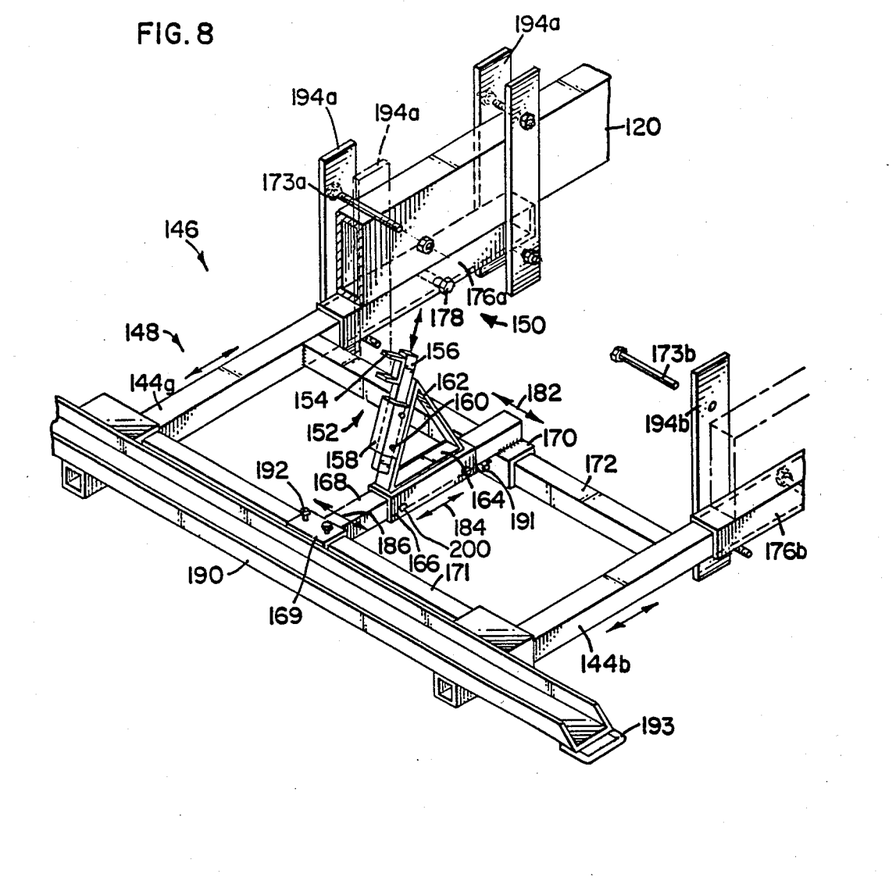
FIG. 8 shows a perspective view of a third motorcycle rack of the present invention.

FIG. 8 shows a perspective view of another embodiment of the present invention. A rack 146 includes a movable portion 148 and a fixable portion 150. The movable portion 148 is substantially identical to the movable portion 14 described above with reference to FIG. 1. However, the movable portion 148 includes an adjustable clamping apparatus 152 in lieu of the clamp 66 and attendant parts as described with reference to FIG. 1.

The clamping apparatus 152 preferably includes a clamping stirrup 154 which is attached to vertical bar 156. Vertical bar 156 is slidably received by vertical channel 158, and vertical channel 158 receives clamping screws 160 which are used to clamp the bar 156 in position once it is appropiately adjusted, as described below. The channel 158 is carried by triangular chassis 162 which includes a base leg 164. The base leg 164 is preferably welded to a first horizontal channel 166 which is sized to admit a main sliding bar 168. The bar 168 carries the horizontal channel 166 and permits the horizontal adjustment of the stirrup 154, toward or away from the channel 190.

Main sliding bar 168 is also connected to rear channel 169 and front channel 170 which are sized to slidably receive connecting struts 171 and 172, respectively, which interconnect the elongate movable members 144 of the movable portion 148 of the rack 146. The channels 169 and 170 support the main sliding bar 168 and are preferably welded to it. Adjustment screws 191 and 192 are received by channels 170 and 169, respectively.

The fixable portion 150 of the rack 146 includes a pair of receiving slides 176 which are sized to slidably admit the movable members 144. The slides 176, as well as the movable members 144, are preferably formed from rectangular steel tubing, and the inside dimensions of the slides 176 are sufficiently larger than the outside dimensions of the movable members 144 to allow sliding engagement and disengagement of the portions 148 and 150 of the rack 146.

The movable portion 148 is engaged with the fixable portion 150 in a fashion substantially similar to that described above with reference to FIGS. 1-5. Once the portions are slidably fully engaged, locking bolts 178 can be inserted through apertures in the slides 176 and corresponding members 144 so as to lock the portions 148 and 150 of the rack 146 together.

The clamping apparatus 152 is vertically and horizontally adjustable as indicated by arrows 180, 182, 184, and 186. That is, when the screws 160 are loosened, the bar 156 can be vertically adjusted to place the stirrup 154 in a position to accommodate the body of a particular type of motorcycle. Once the bar 156 is properly adjusted, the screws 160 are retightened so as to maintain that adjustment. Likewise, clamping screws 200, threadedly engaged with channel 166, can be loosened to allow the channel 166 to horizontally slide on main bar 168 to accommodate horizontal adjustment of the clamping apparatus 152 toward or away from the main channel 190. Adjustment screws 191 and 192, threadedly engaging channels 170 and 169, respectively, allow for adjustment of the clamping apparatus 152 in a back-and-forth horizontal direction so as to adjust stirrup 154 to accomodate particular makes of motorcycles.

The fixable slides 176 are preferably clamped between forward and rearward pairs of vertical struts 194 which are clamped about the frame 120 of the motor vehicle 90.

In use, a motorcycle is rolled onto the main channel 190 of the movable portion 148 according to the procedure described above with reference to FIGS. 1-5. Once the motorcycle is in place, the clamping apparatus 152 is adjusted so that the clamping stirrup 154 aligns with, for example, the kickstand of the bike so that the motorcycle can be securely clamped in place. Adjustment of the clamping apparatus 152 permits the rack 146 to be used with a wide variety of motorcycles. It should be noted that the movable portion 148 of rack 146 preferably includes a restraining assembly (not shown) at the end of channel 190 opposite from ramp hook 193 which is substantially identical to the assembly 44 shown in FIG. 1.

Other modifications of the invention will be apparent to those skilled in the art in light of the foregoing description. This description is intended to provide specific examples of individual embodiments which clearly disclose the present invention. Accordingly, the invention is not limited to these embodiments or to the use of elements having specific configurations and shapes as presented herein. All alternative modifications and variations of the present invention which follow in the spirit and broad scope of the appended claims are included.

I claim:

1. A motor vehicle rack for carrying a load above a ground plane proximate to an end surface of a motor vehicle, the rack being suitable for operatively connecting to a frame component of the motor vehicle, the frame component having a rearward end and a forward end, comprising:
    (a) first and second elongate fixable members, each having a first end and a second end;
    (b) a plurality of struts operatively connected to each of said elongate fixable members, said struts being suitable for connecting to the frame component wherein said elongate fixable members are displaced from the frame component and securely positioned parallel to one another and the ground plane, and said second ends of said elongate fixable members are proximate to the rearward end of the frame component;

(c) first and second elongate movable members, each having a first end and a second end, wherein said movable members are slidably changeable from a disengaged configuration wherein said first ends of said elongate movable members are adjacent to said second ends of said elongate fixable members to an engaged configuration wherein said first ends of said movable member are adjacent to said first ends of said fixable members and said second ends of said movable members are adjacent to said second ends of said fixable members;

(d) a substantially planar platform proximate to said second ends of said elongate movable members and operatively connected thereto, wherein said platform is suitable for being supported substantially parallel to the ground plane;

(e) means for locking said movable members to said fixable members to maintain said movable members and said fixable members in said engaged configuration;

(f) a fixable trailer hitch operatively connected to said fixable members; and (g) a movable trailer hitch operatively connected to said platform, wherein said struts comprise first and second fixable elongate members proximate to said first end thereof and first and second rear strut respectively welded to said first and second elongate fixable members proximate to said second ends thereof, wherein said struts are suitable for welding to the frame component of the motor vehicle, wherein the distance between associated front and rear struts is as least 8 inches at the associated fixable member, and wherein the distance between associated front and rear struts is less than 8 inches at the associated frame component whereby the platform is able to carry very heavy loads.

* * * * *

UNITED STATES PATENT AND TRADEMARK OFFICE
CERTIFICATE OF CORRECTION

PATENT NO. : 4,646,952

DATED : March 3, 1987

INVENTOR(S) : Richard E. Timmers

It is certified that error appears in the above-identified patent and that said Letters Patent is hereby corrected as shown below:

```
Column  3, Line 19, for "engageble" read --engageable--.
Column  3, Line 23, for "rectangualr" read --rectangular--.
Column  3, Lines 63 and 64, for "loadengaging" read
        --load-engaging--.
Column  5, Line 42, for "through" read --though--.
Column  7, Line 62, for "morotcycle" read --motorcycle--.
Column  7, Line 66, for "the clamp, 66" read
        --the clamp 66--.
Column  8, Line 27, for "82" read --84--.
Column  8, Line 56, for "of tilt" read --or tilt--.
Column 10, Line 13, for "is locked," read --is so locked--.
Column 11, Line 46, for "appropiately" read --appropriately--.
Column 14, Line 16, for "as least" read --at least--.
```

Signed and Sealed this

Third Day of November, 1987

Attest:

DONALD J. QUIGG

Attesting Officer

Commissioner of Patents and Trademarks